United States Patent [19]

Frykhult

[11] Patent Number: 5,296,143
[45] Date of Patent: Mar. 22, 1994

[54] APPARATUS FOR FILTERING LIQUIDS

[75] Inventor: Rune Frykhult, Stockholm, Sweden

[73] Assignee: Ingenjorsfirman R. Frykhult AB, Stockholm, Sweden

[21] Appl. No.: 861,981

[22] PCT Filed: Feb. 18, 1991

[86] PCT No.: PCT/SE91/00111

§ 371 Date: Jun. 30, 1992

§ 102(e) Date: Jun. 30, 1992

[87] PCT Pub. No.: WO91/12064

PCT Pub. Date: Aug. 22, 1991

[30] Foreign Application Priority Data

Feb. 16, 1990 [SE] Sweden .................. 9000569
Feb. 16, 1990 [SE] Sweden .................. 9000570

[51] Int. Cl.⁵ .............................. B01D 33/00
[52] U.S. Cl. ............................. 210/331; 210/327; 210/347; 210/398
[58] Field of Search ............... 210/327, 331, 395, 346, 210/347, 359, 402, 403, 404, 398

[56] References Cited

U.S. PATENT DOCUMENTS 4,077,887 3/1978 Langvik .................. 210/331
4,123,363 10/1978 Koskinen .
4,255,264 3/1981 Madsen .
4,330,405 5/1982 Davis et al. .
4,728,424 3/1988 Miura .................. 210/331
4,814,093 3/1989 Frykhult .................. 210/780

FOREIGN PATENT DOCUMENTS 433571 6/1984 Sweden .
2178973 2/1987 United Kingdom .

Primary Examiner—Robert A. Dawson
Assistant Examiner—David Reifsnyder
Attorney, Agent, or Firm—Mason, Fenwick & Lawrence

[57] ABSTRACT

An apparatus for filtering liquids, such as fibre pulp suspensions, includes annular hollow filter discs each of which has two annular liquid pervious, opposed walls covered with filter material, spray nozzle means for cleaning the filter material, and means providing relative movement between the filter material and spray nozzle means. The annular opposed walls of each filter disc are only attached to each other at their radially outer ends, whereas they are spaced from each other at their radially inner ends, such that an annular opening is defined between the interior of the filter disc and a filtrate chamber extending centrally through the filter discs. The spray nozzle means extends from the filtrate chamber through the annular opening into each filter disc. As a result, an extremely pure fine fraction can be produced, clogging of the filtering material is efficiently counteracted, and the operative part of the filter material can be increased.

21 Claims, 6 Drawing Sheets

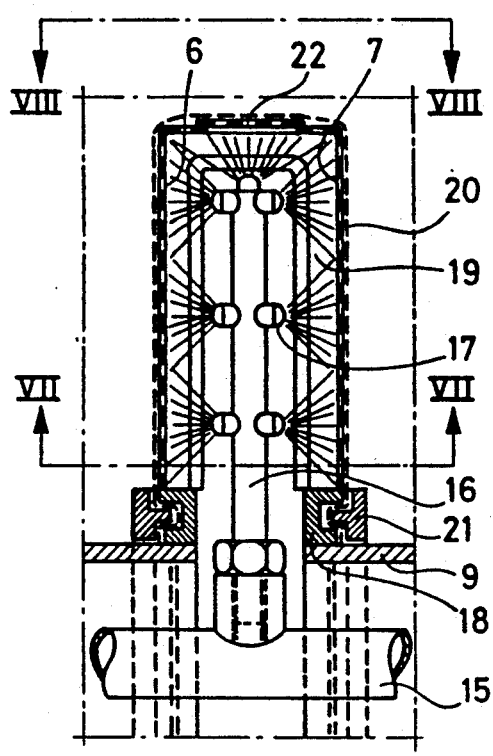
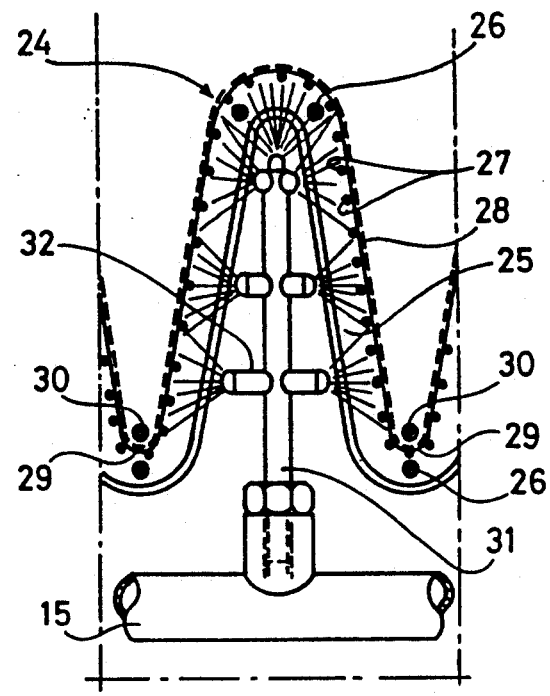
Fig.5      Fig.6
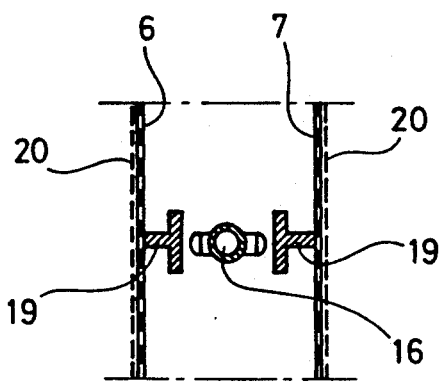
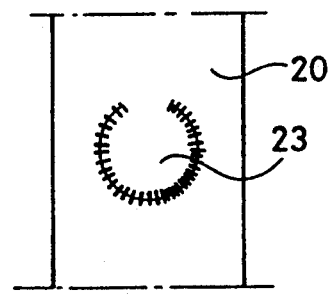
Fig.7      Fig.8

APPARATUS FOR FILTERING LIQUIDS

BACKGROUND OF THE INVENTION

1. Field of the Invention

The present invention relates to an apparatus for filtering liquids, such as fibre pulp suspensions or polluted water.

2. Description of the Prior Art

A common type of filtering apparatuses for filtering liquids comprises at least one annular hollow filter disc adapted to be at least partly immersed in a body of the liquid to be filtered and arranged substantially transverse to an axis extending centrally through the filter disc. The filter disc has two annular opposed walls, which have radially inner ends and radially outer ends. At least one of the two annular opposed walls is pervious by liquid and covered with filter material. Wall means are connected to said opposed walls and form a filtrate chamber, which extends centrally through the hollow disc and which communicates with the interior of the latter. There is means for creating a pressure difference between said body of liquid to be filtered and the interior of the hollow filter disc, such that a fine fraction of the liquid is forced through the filter material into the hollow filter disc and passed therefrom into the filtrate chamber during operation. Fine fraction discharge means is provided for discharging fine fraction from the filtrate chamber and spray nozzle means is provided for spraying a cleansing fluid against the filter material for cleaning the latter. There is means for providing relative movement between the filter material and said spray nozzle means in the circumferential direction of the filter disc.

Conventional filtering apparatuses of this type have their spray nozzle means arranged to spray the cleansing fluid in the form of high pressure jets of liquid from outside the filter disc. The filter disc is vertically positioned and partly immersed in the body of liquid to be filtered, so that part of the filter material is above the body of liquid. The spray nozzle means is stationary and positioned above the body of liquid, while the filter disc is rotatable about said axis. During operation, the spray nozzle means cleans the filter material from particles, as the filter material passes above the body of liquid. The reason for having the spray nozzle means above the body of liquid is to prevent said high pressure jets of cleansing liquid from forcing course particles from the body of liquid into the filter holes of the filter material. Otherwise, the filter material would be rapidly clogged and made inoperative by such course particles during operation.

A drawback to such a conventional filtering apparatus is that some of the small particles which are adhered to the filter material during operation are pushed through the filter holes of the filter material by said high pressure jets of cleansing liquid, with the result that the purity of the fine fraction is degraded. Also, it is inevitable that some particles of relatively course size adhered to the surface of the filter material are pressed into the filter holes of the filter material by said high pressure jets of cleansing liquid, so that, in the long run, the filter material will be more or less clogged. This requires regular stoppage of the conventional filtering apparatus in some filtering applications, for cleaning clogged filter material by chemicals. Another drawback is that only about 60 to 65% of the filter material is operative, i.e. the part of the filter material which is immersed in the body of liquid during operation.

SUMMARY OF THE INVENTION

An object of the present invention is to provide a filtering apparatus, which enables production of a purer fine fraction, as compared with conventional filtering apparatuses.

Another object of the present invention is to provide a filtering apparatus, in which clogging of the filter material is efficiently counteracted.

A further object of the present invention is to provide a filtering apparatus, in which the operative part of the filter material can be increased, as compared with conventional filtering apparatuses.

These objects are fulfilled by means of an apparatus for filtering liquids, such as fibre pulp suspensions or polluted water, comprising:

at least one annular hollow filter disc adapted to be at least partly immersed in a body of a liquid to be filtered and arranged substantially transverse to an axis extending centrally through the filter disc, the disc having two annular opposed walls, at least one of which is pervious to liquid and covered with filter material, the opposed walls having radially inner and outer ends, wall means connected to the annular opposed walls and forming a filtrate chamber, which extends centrally through the hollow disc and which communicates with the interior of the latter, the annular opposed walls being solely attached to each other at their outer ends, whereas they are spaced from each other at their inner ends, such that an annular opening is defined between the interior of the filter disc and the filtrate chamber, means for creating a pressure difference between the body of liquid to be filtered and the interior of the hollow filter disc, such that a fine fraction of the liquid is forced through the filter material into the hollow filter disc and passed therefrom into the filtrate chamber during operation, fine fraction discharge means for discharging fine fraction from the filtrate chamber, spray nozzle means for spraying a cleansing fluid against the filter material for cleaning the filter material, the spray nozzle means extending from the filtrate chamber through the annular opening into the interior of the filter disc, and means for providing relative movement between the filter material and the spray nozzle means in the circumferential direction of the filter disc.

Since the spray nozzle means cleans the filter material from the fine fraction side of the latter, the high pressure jets of cleansing fluid hit the filter material in a direction opposite to that of the flow of fine fraction through the filter material. The effect of this is that fine particles deposited in the filter holes of the filter material are pushed back to the outside of the filter disc, with the result that the created fine fraction of the liquid will be purer.

In addition to this, somewhat courser particles, which are adhered to the outer surface of the filter material cannot be forced into the holes of the filter material and clog these by the high pressure jets of cleansing fluid from the spray nozzle means. In some filtering applications the course particles form mates of particles, which adhere to the filter material. Such mats of particles are readily removed from the filter material by said high pressure jets of fluid, such as air, since the jets of fluid operate from inside the filter material.

Thus, the filter material is most efficiently cleaned during operation. This has the positive consequence that a finer filter material, i.e. a filter material having smaller filter holes, can be utilized, as compared with conventional filtering apparatuses. A finer filter material used means the advantage that the purity of the fine fraction of the liquid is upgraded.

Since the spray means operates within the hollow disc, the latter may be completely immersed in the body of liquid to be filtered. Thus, substantially 100% of the filter material can be operative, which increases the capacity of the filtering apparatus. This means that the costs of a given production of filtered liquid, can be substantially reduced by means of the filtering apparatus of the invention, as compared with the conventional filtering apparatuses.

Both of the body of liquid and the created fine fraction can be subjected to super-atmospheric pressures, if the filter disc is completely immersed in liquid, the pressure acting on the body of liquid being stronger than the pressure acting on the fine fraction. This means that the filtering apparatus of the invention can be integrated in a pressurized process system. Since the filtering apparatus in such a case would operate without admitting air to mix with the treated liquid, the advantage is gained that the risk of reducing the capacity of subsequent treating machinery, because of said mixing of air with the treated liquid, is eliminated. This advantage is particularly important in connection with treating fibre pulp suspensions.

In case the filter disc of the new filtering apparatus is completely immersed in the body of liquid to be filtered, the orientation of the filter disc is optional. For instance, the filter disc may be vertically or horizontally positioned in the body of the liquid, which makes the new filtering apparatus adaptable to various kinds of installations. The desired pressure difference between the outside and the inside of the filter material is readily adjusted by pump means adapted to pump fine fraction from the filtrate chamber. As an alternative, or in combination with said pumping of fine fraction, pump means may be adapted to pump the liquid to be filtered into a closed chamber, in which the filter disc is situated.

With the filter disc completely immersed in the body of liquid to be filtered, it is possible to arrange either the filter disc rotatable about said axis, while the spray nozzle means is stationary, or vice versa. In case the filter disc is rotatable and the spray nozzle means is stationary, it is suitable to position the filter disc vertically and adapt the fine fraction discharge means to discharge fine fraction from the filtrate chamber, such that a pool of fine fraction partly filling the filtrate chamber is created during operation. This enables the spray nozzle means to be arranged, such that at least the part of the filter material which is above the pool of fine fraction is sprayed upon with cleansing fluid during operation. The consequence of this is that the pump energy consumption for pumping the cleansing fluid is reduced, since jets of cleansing fluid are passed through air instead of liquid.

The cleansing fluid can be in the form of liquid or gas, usually liquid.

DESCRIPTION OF THE DRAWINGS

FIG. 5 is a part of an enlarged sectional view of the filter disc shown in FIG. 1, FIG. 6 is a modification of the embodiment shown in FIG. 5, FIGS. 7 and 8 are sectional views along lines VII—VII and VIII—VIII, respectively, of FIG. 5.

DETAILED DESCRIPTION OF THE INVENTION

Figure 1:
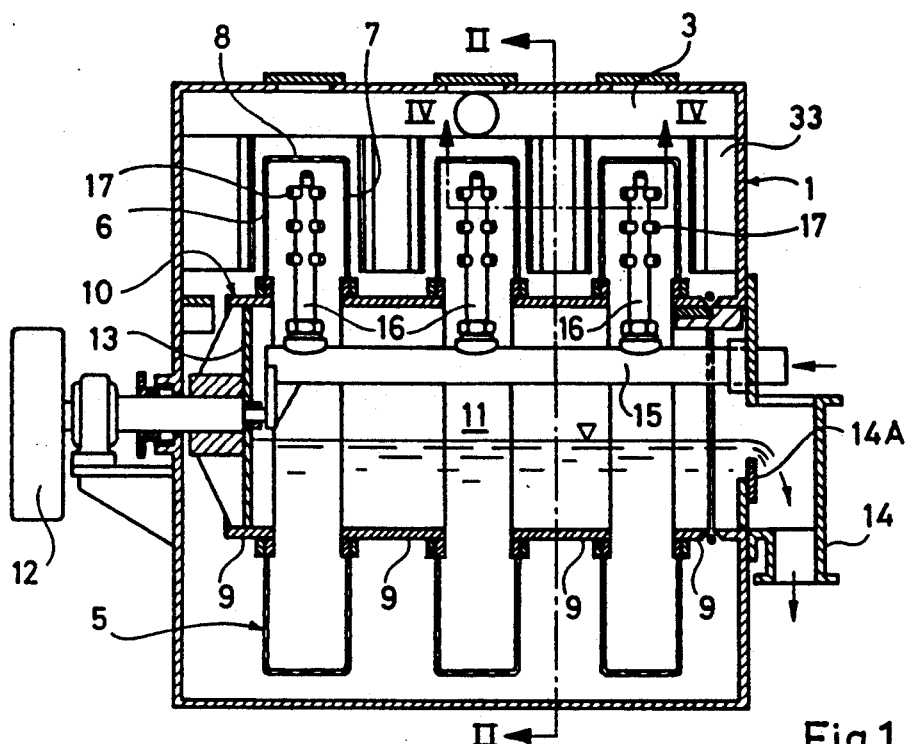
FIG. 1 is a longitudinal cross-section of a first embodiment of the filtering apparatus of the invention.
Figure 4:
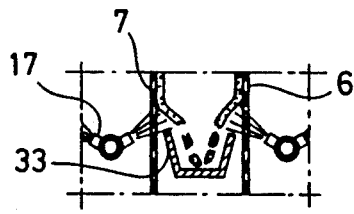
FIG. 4 is a part of a sectional view from above along line IV—IV of FIG. 1.

The filtering apparatus shown in FIGS. 1 to 4 comprises a housing 1 with an inlet member 2 for the liquid to be filtered, and an outlet member 3 at top of the housing 1 for discharging filtered liquid, i.e. created course fraction. A pump 4 is provided to pump the liquid to be filtered into the interior of the housing 1 via the inlet member 2. In the housing 1 there are three annular hollow filter discs 5 spaced from each other and arranged transverse to a horizontal axis, which extends centrally through the filter discs 5. Each filter disc 5 comprises two opposed side walls 6,7 having radially inner and outer circular ends. The side walls 6,7 of each filter disc 5 are attached to each other at their outer ends via a peripheral wall 8. The walls 6 to 8 are made pervious by liquid and are covered with a suitable filter material, such as cloth, felt, net or thin perforated plate.

The radially inner ends of the filter discs 5 are sealingly attached to circular cylindrical wall portions 9, which form a hollow shaft 10, the interior of which constitutes a filtrate chamber 11 for receiving a created fine fraction. The hollow shaft 10 is journalled on the housing 1. A drive motor 12 is engaged with a gable wall 13 at one end of the hollow shaft 10 for rotating the shaft 10. Opposite the gable wall 13, the hollow shaft has an open gable end, at which one of the cylindrical wall portions 9 is sealingly journalled on the housing 1. A fine fraction outlet pipe 14 is arranged on the housing 1 at the open end of the hollow shaft 10.

A stationary pipe 15 for cleansing liquid extends in the upper part of the filtrate chamber 11 and is journalled on the gable wall 13. From the pipe 15, three radial branch pipes 16 extend upwards into the three hollow discs 5, respectively. Each branch pipe 16 is provided with a number of spray nozzles 17.

The side walls of the filter discs 5 are sealingly attached to the wall portions 9, via annular reinforcement members 18 having U-shaped cross-section (FIG. 5). Each filter disc 5 is provided with a plurality of longitudinally U-shaped reinformcement members 19, which are circumferentially spaced from each other and situated between the side walls 6,7. The walls 6,7 and 8 of each filter disc 5, are covered with a filter cloth 20, which constitutes the filter material. Each filter cloth 20 forms a circular bag, which has a centre hole for receiving one of the cylindrical walls 9, and is clamped to the members 18 by means of two annular clamping members 21 having T-shaped cross-section. Each pair of adjacent annular members 18 and 21 are positioned to interlock with each other, such that the filter cloth 20 is stretched between the two opposed pairs of members 18 and 21, when the T-shaped clamping members 21 are clamped to the respective U-shaped reinforcement members 18. The peripheral wall 8 of each filter disc 5 is provided with a removable lid 22, which faces an openable flap 23 in the filter cloth 20, to allow inspection and removal of the branch pipe 16 and the spray nozzles 17, for servicing of the latter. (FIGS. 7 and 8).

The modified filter discs 24 partly shown in FIG. 6 are formed by a plurality of circumferentially spaced beams 25, for instance twelve, which are bent in the radial direction of the filter discs 24 to form longitudinally V-shaped support members for the side walls of the respective filter discs 24. The beams 25 are assembled by means of circumferentially extending bars 26, which are attached to the beams 25. Each side wall of the filter discs 24 is constituted by a flexible thread member 27, which is spirally wound on the beams 25 substantially in the circumferential direction of the filter discs 24.

Filter cloths 28 of a design substantially similar to the above-described filter cloth 20, enclose the side walls of the respective filter discs 24. The filter cloths 28 on adjacent filter discs 24 are joined to each other at their radially inner ends along an annular joint 29. By means of drawing-straps 30 extending along the joints 29, the filter cloths 28 are stretched against the side walls of thread members 27. The stationary pipe 15 for cleansing liquid is provided with branch pipes 31, which have spray nozzles 32 adapted to the V-shaped cross-section of the filter discs 24, such that the spray nozzles 32 are located at the same distance from the filter cloth 28.

At the top of the filter discs 5, there are inclined chute members 33 extending substantially radially along the side walls 6, 7 for guiding course fraction up to the outlet member 3. A course fraction discharge pipe 34 is connected to the outlet member 3 via a pump 35. Between the pipe 34 and a mixing chamber 36 of the inlet member 2, there is a feed-back pipe 37, for feeding a part flow of the course fraction back into the housing 1. Controllable valves 38 and 39 are provided in the feedback pipe 37 and the discharge pipe 34, respectively. The mixing chamber 36 communicates with the interior of the housing 1 through a plurality of distribution holes 40.

Figures 2, 3:
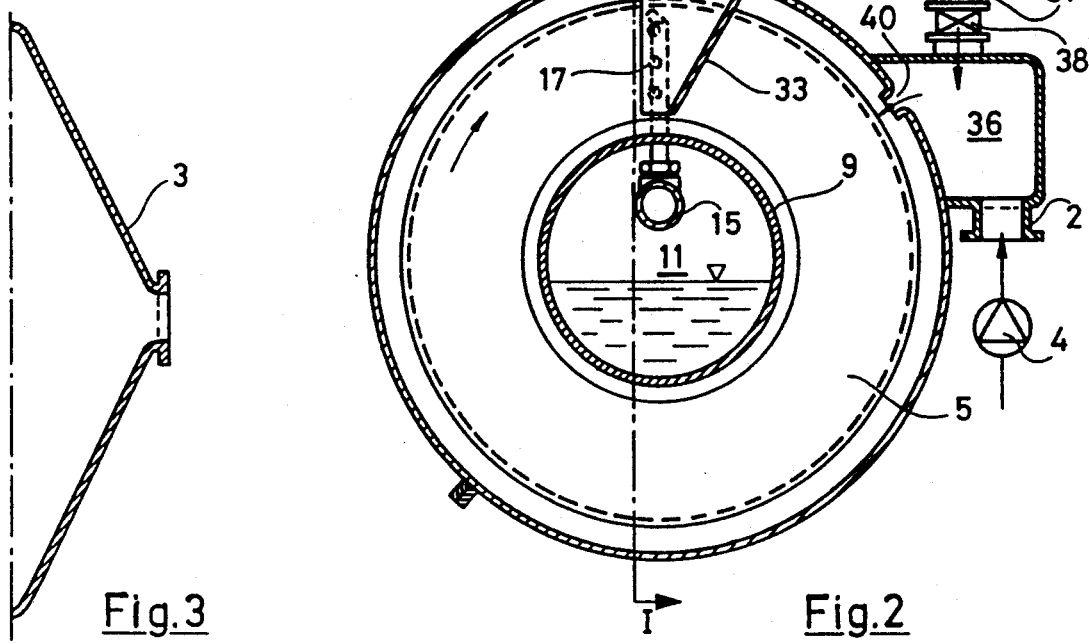
FIG. 2 is a vertical cross-section taken along line II—II of FIG. 1.
FIG. 3 is a horizontal cross-section taken along line III—III of FIG. 2.

In operation, the hollow shaft 10 and the filter discs 5 are rotated by the drive motor 12 in clockwise direction, as shown in FIG. 2. The liquid to be filtered is pumped into the housing 1 via the inlet member 2 by the pump 4. In the housing 1, a fine fraction of the liquid is forced through the filter material on the discs 5 into the interior of the discs 5. The fine fraction is collected in the filtrate chamber 11 and discharged through the outlet 14 via an overflow member 14A, such that a liquid surface of the fine fraction is maintained in the filtrate chamber 11.

Layers of course particles are built up on the outside of the filter material of the discs 5. These layers are pushed off and disintegrated into clumps of course particles by high pressure jets of cleansing liquid from the spray nozzles 17 (FIG. 4) and then guided by the chute members 33 to the outlet member 3. The created course fraction of the liquid is pumped from the outlet member 3 and discharged via the pipe 34 and the valve 39.

A part flow of the created course fraction, the volume of which is determined by the valve 38, is fed back to the mixing chamber 36 via the feed-back pipe 37. The part flow of created course fraction is added to the liquid entering the mixing chamber 36, with the result that the rate of flow of the liquid flowing in the housing 1 from the inlet member 2 to the outlet member 3 is increased. Said increased rate of flow improves the entrainment of the clumps of course particles along the chute member 33 up to the outlet 3. Also, the course particle concentration of the discharged course fraction is increased by said added part flow.

Figure 9:
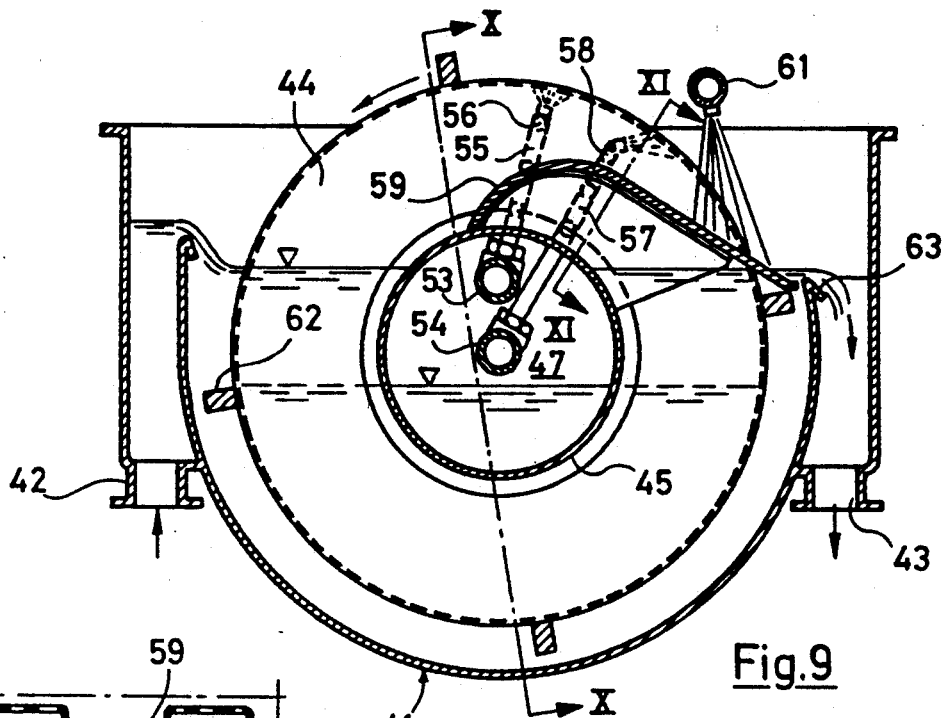
FIG. 9 is a vertical cross-section of a second embodiment of the filtering apparatus of the invention.
Figure 11:
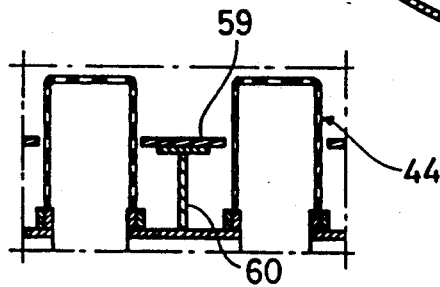
FIG. 11 is a part of a section taken along line XI—XI of FIG. 9.
Figure 10:
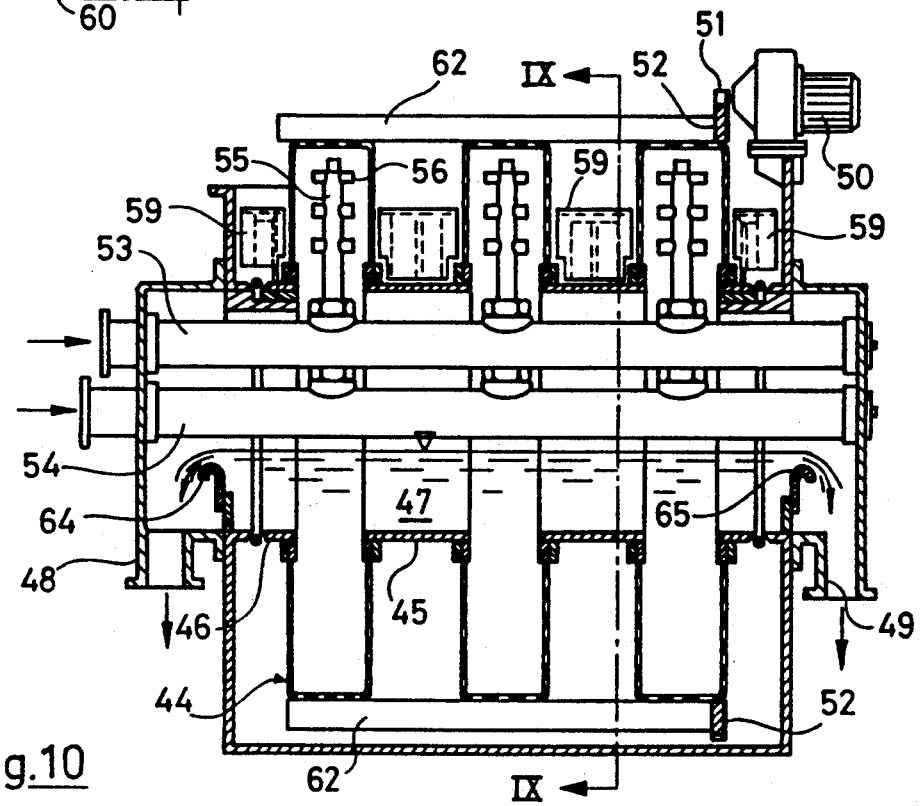
FIG. 10 is a longitudinal cross-section taken along line X—X of FIG. 9.
Figure 12:
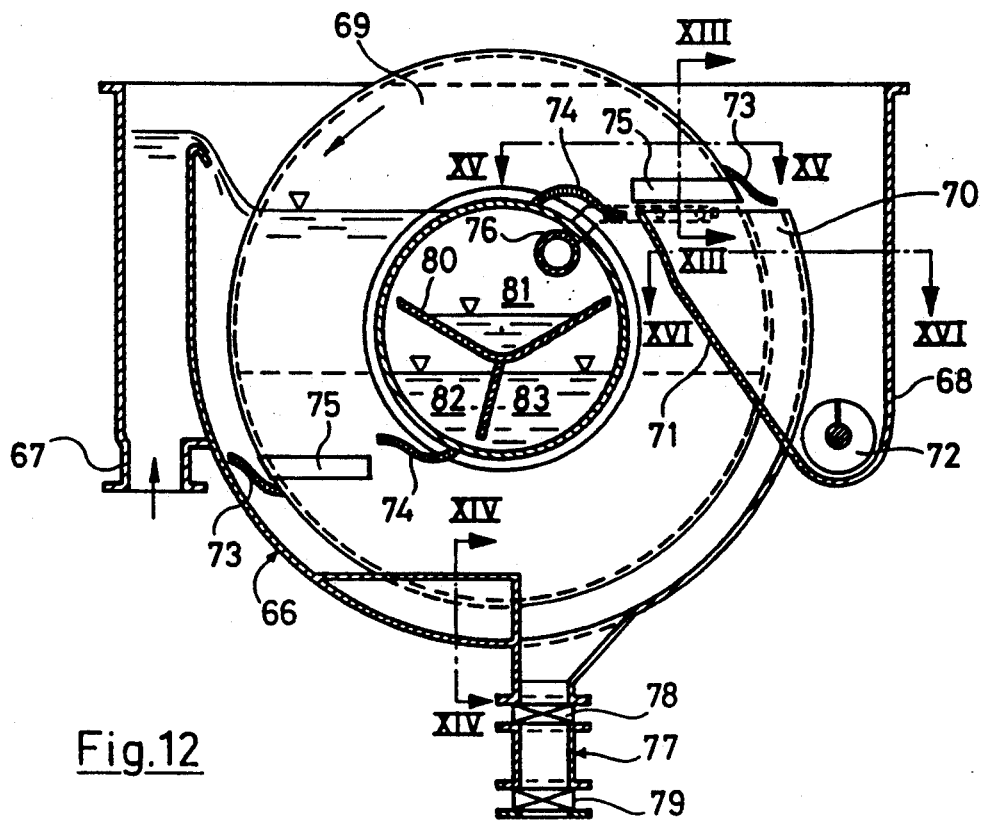
FIG. 12 is a vertical cross-section of a third embodiment of the filtering apparatus of the invention.

The filtering apparatus shown in FIGS. 9 to 11 comprises a container 41 with an inlet 42 at one side of the container 41, for a liquid to be filtered, and an outlet 43 at the opposite side of the container 41, for a created course fraction of the liquid. Three filter discs 44 and circular cylindrical wall portions 45, which are of identical construction to the filter discs 5 and wall portions 9 (FIGS. 1 and 5), are assembled, such that the wall portions 45 form a hollow shaft 46, the interior of which constitutes a filtrate chamber 47. The hollow shaft 46 is of identical construction to the shaft 10 (FIG. 1), except that the former has two open gable ends. At the two open gable ends, the hollow shaft 46 is sealingly journalled on the container 41. Two fine fraction outlets 48 and 49 are arranged on the container 41 at the respective open ends of the hollow shaft 46. A drive motor 50 is arranged to rotate the hollow shaft 46 and the filter discs 44 via a gear transmission 51 and 52.

Two stationary pipes 53 and 54 for fluid extend in the upper part of the filtrate chamber 47. From the pipe 53, three radial branch pipes 55 provided with spray nozzles 56 extend upward into the three hollow discs 44. Likewise, from the pipe 54, three radial branch pipes 57 provided with spray nozzles 58 extend upward into the hollow discs 44. The branch pipes 55 are somewhat circumferentially spaced from the branch pipes 57.

Entrainment members in the form of curved plates 59 extend from the cylindrical wall portions 45 along the side walls of the filter discs 44, backward in the direction of rotation of the filter discs 44. The curved plates 59 are attached to the wall portions 45 via holder members 60 (FIG. 11). The upper surfaces of the curved plates 59 are coated with a low-friction material, such as Teflon ®. Stationary shower means 61 is arranged to flush the radially outer portions of the curved plates 59, as these pass by during rotation of the discs 44.

Four axially extending reinforcement beams 62 are attached to the radially outer ends of the filter discs 44, for stiffening the assembly of filter discs 44 and cylindrical wall portions 45. The beams 62 also operate as entrainment means for entraining course particles or thickened slurry along the wall of the container 41 towards an overflow member 63 at the outlet 43.

In operation, the liquid to be filtered, such as a fibre pulp suspension, is supplied to the container 41 through the inlet 42. The filter discs 44 are rotated by the drive motor 50 in a direction, such that the parts of the filter discs 44 wich are located next to the inlet 42 are displaced downwards, while the parts of the filter discs 44 which are located next to the overflow member 63 are displaced upwards. The hydrostatic pressure in the suspension in the container 41 causes a fine fraction of the suspension, mainly containing water, to pass through the filter material of the filter discs 44 into the filtrate chamber 47. From the filtrate chamber 47, the fine fraction passes over two overflow members 64 and 65, and is discharged via the outlet members 48 and 49.

Porous mats of fibres (course particles) are created on the parts of the filter discs 44 which move in the suspension. As the mats on the filter discs 44 are displaced up above the suspension, they are pushed off the filter material by high pressure jets of fluid (water or air) from the spray nozzles 58 and disintegrated into clumps of fibres. The jets of the spray nozzles 58 also perform a primary cleaning of the filter material of the discs 44. A secondary cleaning of the filter material is performed by jets of fluid (water or air) from the spray nozzles 56.

The thickened suspension containing said clumps of fibres is entrained by the curved plates 59 and the beams 62 over the overflow member 63 to the outlet 43. Clumps of fibres lifted above the suspension by the curved plates 59 are flushed off the latter by the shower means 61, in the position of the curved plates 59 illustrated in FIG. 9.

Figure 14:
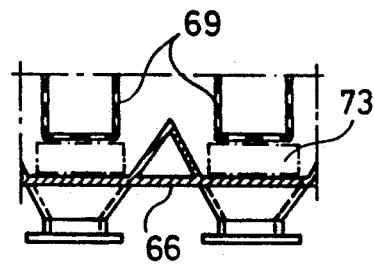
FIGS. 13 to 16 are parts of sectional views along lines XIII—XIII, XIV—XIV, XV—XV and XVI—XVI, respectively, of FIG. 12.
Figure 15:
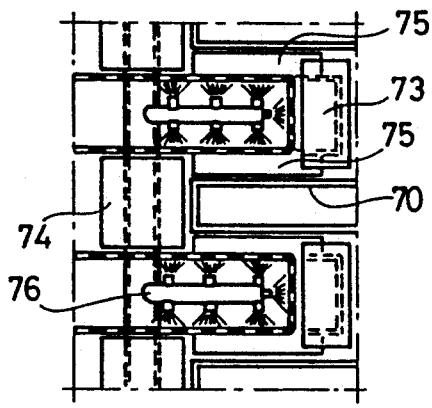
Figure 16:
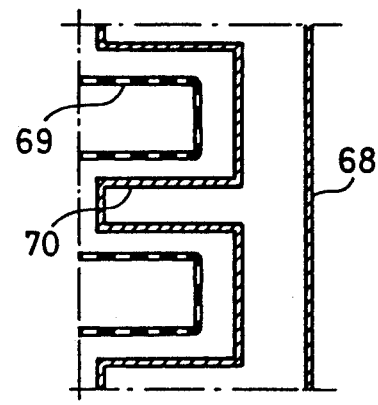

The filtering apparatus shown in FIGS. 12 to 17 is particularly suited for recovering fibres or other valuable particles from polluted water, and for cleaning water and other liquids. This apparatus comprises a container 66 with an inlet member 67 for the liquid to be filtered and a course fraction discharge member 68 for a created course fraction of the liquid. A number of filter discs 69, which are of identical construction to the filter discs 5 (FIGS. 1 and 5), are vertically arranged in the container 66. The wall of the container 66 forms an overflow member 70 at the course fraction discharge member 68. The overflow member 70 extends inward along each side of the filter discs 69, such that chute members 71 are formed, which are inclined toward the discharge member 68 (FIG. 16). The discharge member 68 is provided with a screw conveyor 72 for discharging course fraction.

Each side of each filter discs 69 is provided with two outer entrainment members 73 extending outward from the radially outer end of the filter disc 69 and backwards in the direction of rotation of the filter disc 69, and two inner entrainment members 74 extending outward from the radially inner end of the filter disc 69 and backward in the direction of rotation of the filter disc 69. The entrainment members 73 and 74 are positioned, such that they just go clear of the overflow member 70, as they pass the latter during rotation of the filter discs 69. Radially between the outer and inner entrainment members 73 and 74 on each side of the filter discs 69, there are two intermediate entrainment members 75. The axial extension of the intermediate members 75 is limited, such that the members 75 just go clear of the overflow member 70, as they pass the latter during rotation of the filter discs 69 (FIG. 15).

Figure 13:
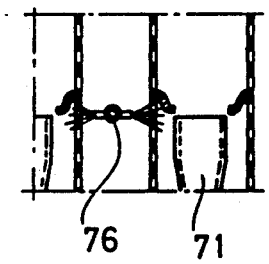

Spray nozzle means 76 is arranged within each filter disc 69 and positioned at the same level as the upper end of the overflow member 70 (FIG. 13).

At the bottom of the container 66, there is a sluice member 77 with two valves 78 and 79 below each filter disc 69, for discharging sediments from the interior of the housing 66 (FIG. 14).

A stationary wall member 80 extends axially and centrally through the filter discs 69, and divides the filtrate chamber into three part chambers 81, 82 and 83.

In operation, the liquid to be filtered is supplied into the container 66 via the inlet member 67. Heavy particles in the liquid sink by gravity and form sediments, which are entrained by the entrainment members 73 to the sluice members 77. From these the sediments are discharged at intervals by opening and closing the valves 78 and 79.

Three fractions of filtrate are forced into the hollow discs 69 and distributed to the chamber 81 as a cloudy filtrate, to the chamber 82 as a clear filtrate and to the chamber 83 as an ultra-clear filtrate. Particles swimming in the liquid are entrained by the entrainment members 73 to 75 up to the overflow member 70, where they are dropped into the chute members 71 with the aid of the jets of fluid from the spray nozzle means 76.

In some filtering applications, it has been found that at least parts of the curved plates 59 (FIGS. 9 to 11) and the entrainment member 73–75 (FIGS. 12 and 15) with advantage are made of liquid pervious material, such as net, grid or perforated plate. Additional shower means 84 may be arranged between the filter discs, to flush such perforated plates or entrainment members on their back sides, when the perforated plates or entrainment members are close to the overflow members during the rotation of the filter discs (FIG. 17)

Figure 17:
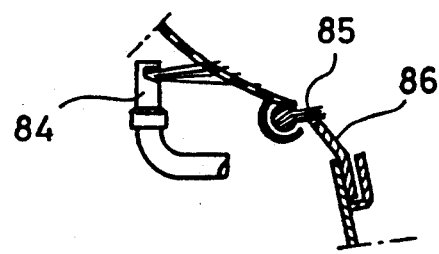
FIG. 17 is a part view of a modification of the embodiment shown i FIG. 12.

Brush members 85 may be arranged on the tips of the curved plates 59 (FIGS. 9 to 11) or the entrainment members 73 to 75 (FIGS. 12 and 15), for brushing particles to the over-flow members 70 and 63 (FIG. 17). Said overflow members may be provided with axial elastic lists 86 arranged to cover the gaps between the overflow members and the radially outer ends of the filter discs. As the curved plates 59 and the entrainment members 62 and 73 pass by during rotation of the discs, the elastic lists 86 are bent away by the former. The lists 86 prevent some solid particles from falling back into the liquid, as the particles are flushed from the curved plate 59 or dropped from the entrainment members 73 to 75.

Figure 18:
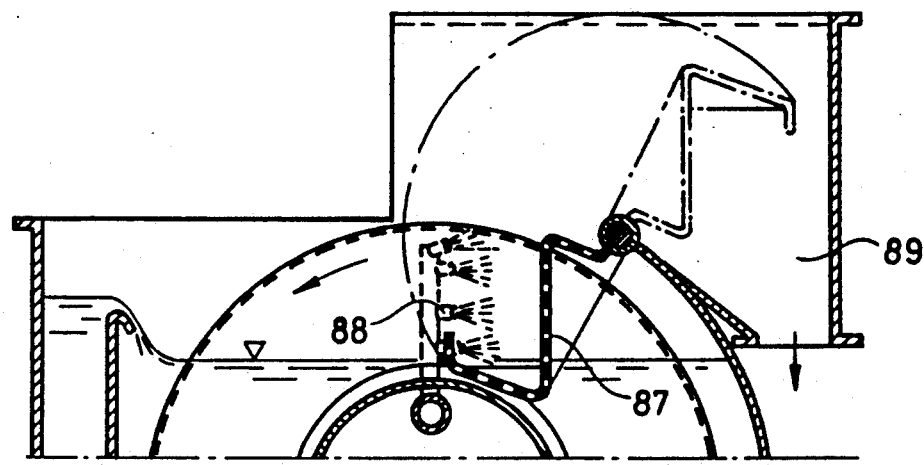
FIG. 18 is a vertical cross-section of a fourth embodiment of the apparatus of the invention, showing one half of the apparatus.

In some filtering applications, it is desirable that no liquid or just an insignificant volume of liquid is discharged together with the solid particles. This desire is fulfilled by the filtering apparatus shown in FIG. 18, which is substantially identical to the apparatus shown in FIG. 9, except that the former has course fraction discharge means in the form of liquid pervious scoop members 87 arranged at the upper parts of the filter discs. The scoop members 87 are adapted to be pivoted at intervals between a first position, in which they receive course particles flushed away from the filter discs by spray nozzle means 88, and a second position (indicated in dash-dotted lines), in which said received course particles are dropped from the scoop members 87 into an outlet 89.

Figure 19:
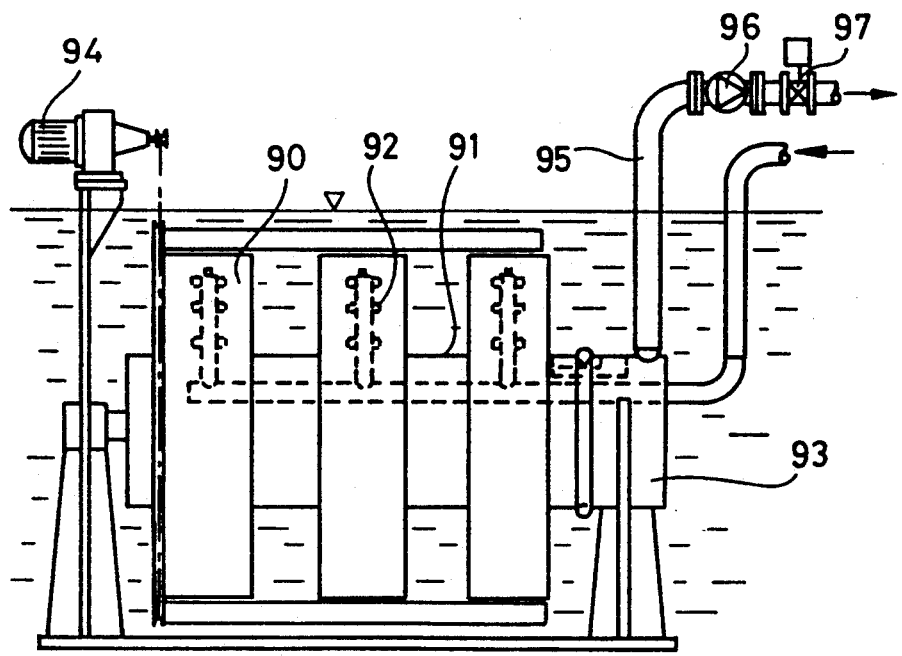
FIG. 19 is a side view of a fifth embodiment of the apparatus of the invention.

The filtering apparatus shown in FIG. 19 is immersed in a watercourse for producing pre-cleaned water for various water consuming industry, such as heat exchanger plants, heat pump plants, processing plants and water cleaning plants. The apparatus comprises three filter discs 90, a hollow shaft 91 and spray nozzles 92, which are of identical construction to the filter discs 5, the hollow shaft 10 and the spray nozzles 17, respectively (FIG. 1). The hollow shaft 91 is journalled on a frame 93, which is situated on the bottom of the watercourse. The frame 93 is provided with a drive motor 94 above the watercourse adapted to rotate the discs 90 via a chain transmission.

A filtrate conduit 95 is connected to the interior of the hollow shaft 91 via a chamber in the frame 93. There is a pump 96 in the filtrate conduit 95 for providing a pressure difference between the outside and the inside of each filter disc 90. Said pressure difference is adjusted by means of a valve 97 in the filtrate conduit 95.

In the paper making industry, an assembly of filter discs 90 and spray nozzle means 92 (FIG. 19) may be utilized as a so-called pre-dewaterer for fibre pulp suspensions and be arranged together with a conventional vacuum filter rotor in a common container, said assembly being at least partly immersed in the suspension.

Figure 20:
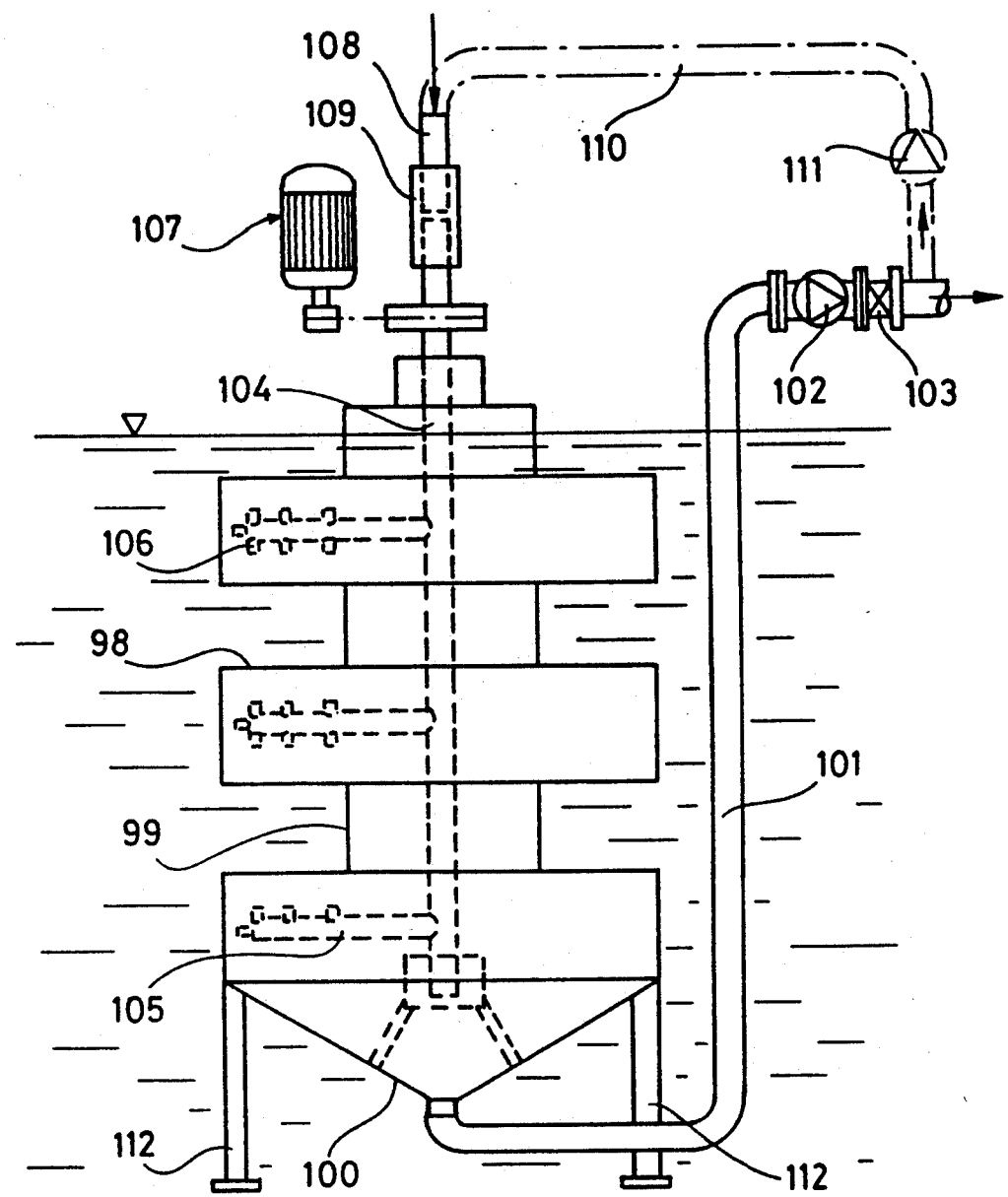
FIG. 20 is a side view of a sixth embodiment of the apparatus of the invention.

The filtering apparatus shown in FIG. 20 is a modification of the apparatus shown in FIG. 19 and is particularly suited for deep watercourses. The apparatus of FIG. 20 comprises three stationary horizontal filter discs 98 mounted on a vertical drum 99, the interior of which constitutes a filtrate chamber. The undermost side wall of the filter disc 98 is made of non-filter material and forms a funnel member 100, the apex of which is connected to a filtrate conduit 101. There is a pump 102 in the filtrate conduit 101 for providing a pressure difference between the outside and the inside of the filter discs 98. Said pressure difference is adjusted by means of a valve 103 in the filtrate conduit 101.

A rotatable hollow shaft 104 for water extends from above the watercourse into the drum 99 coaxially with the discs 98. The shaft 104 is journalled on the drum 99 and is provided with three branch pipes 105 extending into the respective discs 98. Each branch pipe 105 is provided with a plurality of spray nozzles 106. Above the watercourse, there is a drive motor arrangement 107, for rotating the shaft 104 and the spray nozzles 106. The shaft 104 is connected to a stationary conduit 108 via a sliding coupling 109. Purified water from the filtrate conduit 101 may be supplied to the conduit 108 via a feed-back conduit 110 provided with a pump 111 (indicated in dash dotted lines). The apparatus is supported on the bottom of the watercourse by means of legs 112 attached to the funnel member 100.

In water purification plants, the filtering apparatus according to FIG. 20 constitutes a low-price alternative to conventional equipment.

It should be appreciated that other combinations of the various features included in the embodiments of the invention described above are concievable.

I claim:

1. An apparatus for filtering liquids, such as fiber pulp suspensions or polluted water, comprising:

at least one annular hollow filter disc adapted to be at least partly immersed in a body of a liquid to be filtered and arranged substantially transverse to an axis extending centrally through the filter disc, the disc having two annular opposed walls, at least one of which is pervious to liquid and covered with filter material, the opposed walls having radially inner and outer ends;

wall means connected to the annular opposed walls and forming a filtrate chamber, which extends centrally through the hollow disc and which communicates with the interior of the latter;

the annular opposed walls being solely attached to each other at their outer ends, whereas they are spaced from each other at their inner ends, such that an annular opening is defined between the interior of the filter disc and the filtrate chamber;

means for creating a pressure difference between the body of liquid to be filtered and the interior of the hollow filter disc, such that a fine fraction of the liquid is forced through the filter material into the hollow filter disc and passed therefrom into the filtrate chamber during operation;

fine fraction discharge means for discharging fine fraction from the filtrate chamber;

spray nozzle means for spraying a cleansing fluid against the filter material for cleaning the filter material;

the spray nozzle means extending from the filtrate chamber through the annular opening into the interior of the filter disc; and means for providing relative movement between the filter material and the spray nozzle means in the circumferential direction of the filter disc.

2. An apparatus according to claim 1, wherein the filter disc is adapted to be completely immersed in the body of liquid to be filtered.

3. An apparatus according to claim 2, wherein the spray nozzle means is stationary, and means is provided for rotating the filter disc about the axis.

4. An apparatus according to claim 3, further including a housing forming a closed chamber, in which the filter disc is situated, the housing having inlet means for supplying the liquid to be filtered to the closed chamber, and course fraction outlet means for discharging a created course fraction of the liquid from the closed chamber.

5. An apparatus according to claim 4, wherein the means for providing a pressure difference comprises pump means adapted to pump the liquid to be filtered into the closed chamber via the inlet means.

6. An apparatus according to claim 5, wherein means is provided for feeding part of the course fraction discharged from the course fraction outlet means to the inlet means, for increasing the rate of flow of the liquid flowing in the closed chamber between the inlet means and the course fraction outlet means.

7. An apparatus according to claim 6, wherein the filter disc is positioned substantially vertically in the body of liquid to be filtered, and the fine fraction discharge means is adapted to discharge fine fraction from the filtrate chamber, such that a pool of fine fraction partly filling the filtrate chamber is created during operation, the spray nozzle means being arranged to spray cleansing fluid against at least the part of the filter material which is above the pool of fine fraction.

8. An apparatus according to claim 7, wherein the course fraction outlet means is arranged to discharge course fraction from the top of the closed chamber.

9. An apparatus according to claim 5, wherein the filter disc is positioned substantially vertically in the body of liquid to be filtered, and the fine fraction discharge means is adapted to discharge fine fraction from the filtrate chamber, such that a pool of fine fraction partly filling the filtrate chamber is created during operation, the spray nozzle means being arranged to spray cleansing fluid against at least the part of the filter material which is above the pool of fine fraction.

10. An apparatus according to claim 9, wherein the course fraction outlet means is arranged to discharge course fraction from the top of the closed chamber.

11. An apparatus according to claim 2, wherein the filter disc is stationary, and means is provided for rotating the spray nozzle means about the axis.

12. An apparatus according to claim 11, wherein the means for providing a pressure difference comprises pump means adapted to pump fine fraction from the filtrate chamber.

13. An apparatus according to claim 12, wherein the filter disc is positioned substantially horizontally in the body of liquid to be filtered.

14. An apparatus according to claim 13, wherein the filtrate chamber has a bottom part located below the filter disc, and the fine fraction discharge means comprises an outlet member arranged to discharge fine fraction from the bottom part of the filtrate chamber.

15. An apparatus according to claim 14, wherein the rotating means comprises a rotatable hollow shaft extending from above into the filtrate chamber coaxial with the axis, and a drive motor for rotating the hollow shaft, the spray nozzle means being connected to the hollow shaft to be rotated therewith and to receive cleansing fluid through the hollow shaft.

16. An apparatus according to claim 1, wherein the spray nozzle means is stationary, and means is provided for rotating the filter disc about the axis, the filter disc being positioned substantially vertically and partly immersed in the body of liquid to be filtered, such that part of the filter material is above the body of liquid.

17. An apparatus according to claim 16, further including a container containing the body of liquid to be filtered, inlet means for supplying the liquid to the container, and course fraction discharge means for discharging a created course fraction from the container, the spray nozzle means being arranged to spray cleansing fluid against at least the part of the filter material which is above the body of liquid.

18. An apparatus according to claim 17, wherein each outer side of the filter disc is provided with at least one entrainment member extending from the wall means backward in the rotational direction of the filter disc, for entraining created course fraction of the liquid in the container radially outward and circumferentially forward to an overflow member in the container.

19. An apparatus according to claim 17, wherein the course fraction discharge means comprises a scoop member arranged at each side of the filter disc, the scoop member being pivotable between a first position, in which it receives created course fraction, when the latter is loosened from the filter material by means of the spray nozzle means and a second position, in which the received course fraction is dropped from the scoop member to the outside of the container.

20. An apparatus according to claim 17, wherein the course fraction discharge means comprises a stationary chute member arranged at each side of the filter disc, the chute member being inclined outward of the filter disc, for conducting course fraction dropped from the filter material out of the container.

21. An apparatus for filtering liquids, such as fiber pulp suspensions or polluted water, comprising:
at least two annular hollow filter discs adapted to be filtered and arranged substantially transverse to an axis extending centrally through the filter discs, each disc having two annular opposed walls, at least one of which is pervious by liquid and covered with filter material, the opposed walls having radially inner and outer ends;
wall means connected to the annular opposed walls and forming a filtrate chamber, which extends centrally through the hollow discs and which communicates with the interior of the latter, the annular opposed walls of each filter disc being solely attached to each other at their outer ends, whereas they are spaced from each other at their inner ends, such that an annular opening is defined between the interior of each filter disc and the filtrate chamber;
means for creating a pressure difference between the body of liquid to be filtered and the interior of the hollow filter discs, such that a fine fraction of the liquid is forced through the filter material into the hollow filter discs and passed therefrom into the filtrate chamber during operation;
fine fraction discharge means for discharging fine fraction from the filtrate chamber;
spray nozzle means for spraying a cleansing fluid against the filter material for cleaning the filter material, the spray nozzle means extending from the filtrate chamber through the annular opening of each filter disc into the interior of each filter disc;
means for providing relative movement between the filter material and spray nozzle means in the circumferential direction of the filter discs; and
at least one axially extending reinforcement beam attached to the walls of the filter discs at the outer ends of the filter discs.

* * * * *